C. M. RHODES.
DEVICE FOR CRANKING INTERNAL COMBUSTION ENGINES.
APPLICATION FILED OCT. 3, 1917.
1,286,778. Patented Dec. 3, 1918.
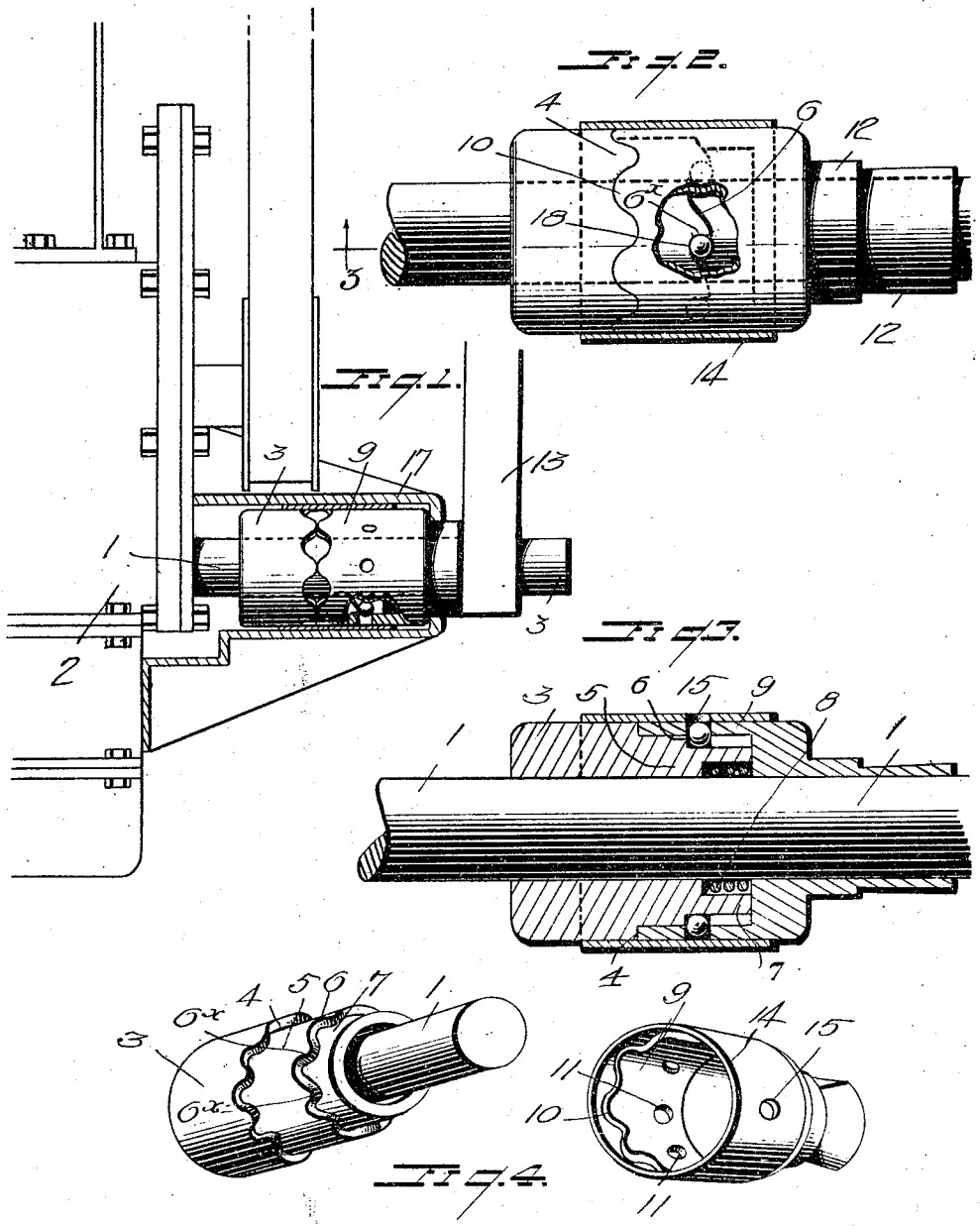

UNITED STATES PATENT OFFICE.

CHARLES M. RHODES, OF STEUBENVILLE, OHIO.

DEVICE FOR CRANKING INTERNAL-COMBUSTION ENGINES.

1,286,778.      Specification of Letters Patent.      Patented Dec. 3, 1918.

Application filed October 3, 1917. Serial No. 194,504.

*To all whom it may concern:*

Be it known that I, CHARLES M. RHODES, a citizen of the United States, and a resident of Steubenville, in the county of Jefferson and State of Ohio, have made certain new and useful Improvements in Devices for Cranking Internal-Combustion Engines, of which the following is a specification.

My invention relates to improvements in devices for cranking internal-combustion engines, and it consists in the combinations, constructions and arrangements herein described and claimed.

An object of my invention is to provide a device by means of which injury from backfire may be avoided, due to the fact that the clutch members are thrown out of engagement.

A further object of my invention is to provide a device of the type described with ball bearings which insure disengagement of the clutch members.

A further object of my invention is to provide a device of the type described which consists of few parts, and which is, therefore, not easily liable to get out of order.

My invention is illustrated in the accompanying drawings forming part of this application, in which, Figure 1 is a side view of the device as applied to an automobile;

Fig. 2 is an enlarged elevational view, certain parts being shown in section;

Fig. 3 is a section through the device;

Fig. 4 is a perspective view showing the two clutch members.

In carrying out my invention I provide a clutch member which is rigidly secured to the shaft 1 of the automobile 2. This clutch member consists of a cylindrical body portion 3, having a fluted edge 4. A second reduced integral cylindrical portion 5 is also provided with a fluted edge 6. The fluted edge 4 forms a symmetrical curve after the manner of the so-called "sine" curve. The fluted edge 6, however, has a portion $6^x$ (see Figs. 2 and 4) which is almost straight, the remaining portion being curved at first sharply (see Fig. 2), this curve gradually flattening out as it nears the adjacent portion $6^x$.

A further reduced portion 7 forms an integral continuation of the portion 5, and this portion 7 is spaced from the shaft 1 to which the clutch member is secured, in order to provide room for a spring 8.

The companion clutch member consists of a hollow cylinder 9, also having a fluted edge 10, arranged to engage the fluted edge 4 of the companion clutch member. The cylinder 9 is provided with a series of openings 11. The member 9 has an extension 12 which is flattened to provide attaching means for a crank handle 13. On the outside of the cylinders 3 and 9 is a ring or band 14, which is provided with a single opening 15 arranged to register with any of the recesses 11 as the ring is turned.

From the foregoing description of the various parts of the device the operation thereof will be readily understood.

As stated, the portion 3 is secured to the shaft 1 while the portion 9 is free to turn on the shaft. In Fig. 1 I have shown the normal position of the parts. It will be observed that a portion of the frame 17 is provided with an opening arranged to receive the extension 12. The spring 8 normally keeps the clutch members 3 and 9 apart. The ring 14 is turned to bring the opening 15 successively into registration with the openings 11, and a ball 18 is dropped into each opening 11, the ring being then turned to bring the opening out of registration with the balls, so as to hold the latter securely in place.

When now it is desired to crank the engine the handle 13 is grasped and pushed inwardly compressing the spring 8 and at the same time the clutch member 9 is rotated. The teeth formed by the curved or fluted portions of the engaging members 3 and 9 will come into mesh so as to impart rotary movement to the shaft 1, through the medium of the clutch member 3. If the engine should back fire, then the clutch member 9 will be immediately forced away from the clutch member 3, because of the fact that the portion $6^x$ has a different curvature from that of the fluted edge 4. The slight curvature $6^x$ will permit a relative movement of the interlocking members 9 and 3 through their teeth 10 and 4, and this, together with the action of the spring 8 will move the clutch member 9 outwardly. This is facilitated by the movement of the balls 18 out from the sockets formed by the convolutions 6 onto the cylindrical portion 7. When the clutch member 9 is pushed inwardly again, however, these balls will be brought into the sockets and against the flat sides 6× thereof, thereby tending to form an auxiliary clutch so as to supplement the action of the teeth 4 and 10.

The device is so arranged that it requires comparatively little effort to bring the clutch members into engagement sufficient to turn the engine, but, as stated, on back fire the members are immediately forced out of engagement, thereby eliminating any danger of the breaking of the arm of the person who cranks the engine.

I claim:—

1. A device for cranking internal combustion engines, comprising a clutch member arranged to be secured to the engine shaft, said clutch member having a cylindrical body portion, a reduced cylindrical portion adjacent to said cylindrical body portion, and a further reduced cylindrical portion adjacent to said first named reduced portion, said body portion having a series of curved teeth, and said first named reduced portion having a series of sockets on the edge thereof, a second clutch member consisting of a sleeve having curved teeth arranged to engage the curved teeth of the companion clutch member, and being provided with a series of peripheral openings arranged to register with the sockets in said first named reduced portion, and balls carried in the openings in said sleeve.

2. A device for cranking internal combustion engines, comprising a clutch member arranged to be secured to the engine shaft, said clutch member having a cylindrical body portion, a reduced cylindrical portion adjacent to said cylindrical body portion, and a further reduced cylindrical portion adjacent to said first named reduced portion, said body portion having a series of curved teeth, and said first named reduced portion having a series of sockets on the edge thereof, a second clutch member consisting of a sleeve having curved teeth arranged to engage the curved teeth of the companion clutch member and being provided with a series of peripheral openings arranged to register with the sockets in said first named reduced portion, balls carried in the openings in said sleeve, and a spring disposed within the sleeve and arranged to bear on said first named clutch member.

3. A device for cranking internal combustion engines, comprising a clutch member arranged to be secured to the engine shaft, said clutch member having a cylindrical body portion, a reduced cylindrical portion adjacent to said cylindrical body portion, and a further reduced cylindrical portion adjacent to said first named reduced portion, said body portion having a series of curved teeth, and said first named reduced portion having a series of sockets on the edge thereof, a second clutch member consisting of a sleeve having curved teeth arranged to engage the curved teeth of the companion clutch member and being provided with a series of peripheral openings arranged to register with the sockets in said first named reduced portion, balls carried in the openings in said sleeve, a spring disposed within the sleeve and arranged to bear on said first named clutch member, and a ring surrounding a portion of each of said clutch members, one of said clutch members being movable toward and away from the other clutch members within the ring.

4. A device for cranking internal combustion engines, comprising a clutch member arranged to be secured to the engine shaft, said clutch member having a cylindrical body portion, a reduced cylindrical portion adjacent to said cylindrical body portion, and a further reduced cylindrical portion adjacent to said first named reduced portion, said body portion having a series of curved teeth, and said first named reduced portion having a series of sockets on the edge thereof, a second clutch member consisting of a sleeve having curved teeth arranged to engage the curved teeth of the companion clutch member and being provided with a series of peripheral openings arranged to register with the sockets in said first named reduced portion, balls carried in the openings in said sleeve, a spring disposed within the sleeve and arranged to bear on said first named clutch member, a ring surrounding a portion of each of said clutch members, one of said clutch members being movable toward and away from the other clutch members within the ring, said ring being rotatable and being provided with an opening arranged to register with the openings in said second named clutch member as the ring is turned.

5. A device for cranking internal combustion engines comprising a clutch member arranged to be secured to the engine shaft, said clutch member having two clutching portions, consisting of curved teeth, the teeth of one portion being of a different curve from that of the other, a second clutch member having teeth arranged to engage one set of teeth on the first named clutch member, and being provided with a series of sockets, each socket containing a ball arranged to engage the second set of teeth on the first named clutch member.

6. A device for cranking internal combustion engines comprising a clutch member arranged to be secured to the engine shaft, said clutch member having two clutching portions, consisting of curved teeth, the teeth of one portion being of a different curve from that of the other, a second clutch member having teeth arranged to engage one set of teeth on the first named clutch member, and being provided with a series of sockets, each socket containing a ball arranged to engage the second set of teeth on the first named clutch member, and a spring disposed between the clutch members for normally holding them apart.

CHARLES M. RHODES.

Copies of this patent may be obtained for five cents each, by addressing the "Commissioner of Patents, Washington, D. C."